UNITED STATES PATENT OFFICE 2,303,698

DERIVATIVES OF P - AMINOBENZENESULPHONYLAMIDE (I. E., SULPHANILAMIDE) AND THE PROCESS OF PRODUCING THEM

Morris S. Kharasch and Otto Reinmuth, Chicago, Ill., assignors to Eli Lilly and Company, Indianapolis, Ind., a corporation of Indiana No Drawing. Application June 3, 1940, Serial No. 338,656

7 Claims. (Cl. 260—295)

Our invention relates to certain new derivatives of p-aminobenzenesulphonylamide (i. e., sulphanilamide) and to the process of producing them.

Our new products have been found to be of low toxicity, and to be efficacious on oral, parenteral, and intravenous administration for the treatment of various infections, including streptococcal, pneumococcal, and gonococcal infections, especially those of great virulence.

These new derivatives are represented by the following general formula:

(1) 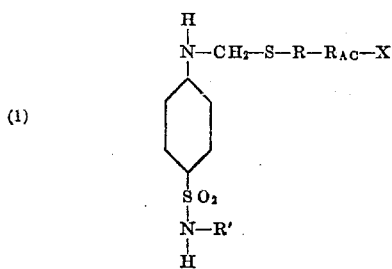

in which R represents a member of the broad general class of divalent monocarbon and polycarbon hydrocarbon groups, including inter alia the methylene group (—$CH_2$—), the polymethylene groups [e. g., the ethylene group (—$CH_2$—$CH_2$—)], the alkanal and aryl-alkanal groups [e. g., the ethylidine

and benzal

groups], and the arylene groups [e. g., the several phenylene (—$C_6H_4$—) groups], any of which having two or more carbon atoms may have one or more of its hydrogen atoms on any carbon atom not attached to sulphur replaced by the hydroxyl group, or by an acylated hydroxyl or acylated amino group; $R_{AC}$ represents an acidic group of the class consisting of the dehydrocarboxylic

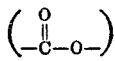

group and the dehydrosulphonic

group; and X represents a member of the general class of positive ions, consisting of hydrogen, the alkali metals, the normal equivalents of the alkaline-earth metals, the nitrogen hydro-onium ions derived from ammonia, the alkylamines, the alkanolamines, and the polymethylenediamines, including ethylene diamine; and R' is a monovalent radical of the broad general class including hydrogen, the lower alkyl radicals (e. g., the methyl and ethyl radicals), the hydroxlated lower alkyl radicals having more than one carbon atom [e. g., —$CH_2CH_2OH$, —$CH_2CH_2CH_2OH$, and —$CH(CH_3)CH_2OH$], the acyl radicals [e. g., the acetyl (—$COCH_3$), benzoyl (—$COC_6H_5$), the p-acetamidobenzenesulphonyl (—$SO_2C_6H_4NHCOCH_3$), and the p-aminobenzenesulphonyl (—$SO_2C_6H_4NH_2$)

radicals], the hydroxyl radical, the phenyl radical, the p-nitrophenyl radical, the α-pyridyl

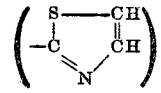

radical, the 2-thiazolyl

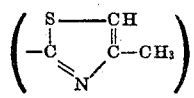

radical, and the substituted 2-thiazolyl radicals [e. g., the 4-methylthiazolyl-2

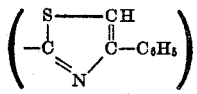

and the 4-phenylthiazolyl-2

$$\left(\begin{array}{c}S\!-\!-\!-\!CH\\ -C\diagdown\diagup\!\!\!C\!-\!C_6H_5\\ N\end{array}\right)$$

radicals].

The salts are all freely soluble in water, and in general relatively stable in the solid state.

The metallic salts are in general very slightly soluble in absolute alcohol, and insoluble in ether, benzene, and acetone. The ammonium and aminium salts are in general moderately soluble in absolute alcohol, but insoluble in ether, benzene, and acetone. The acids differ as to their solubility in water, and in general are less stable than are the salts.

In preparing our new products we proceed in general as follows:

To a solution or suspension of p-aminobenzenesulphonylamide or a p-aminobenzene sulphonylamide derivative having the general formula:

(2) 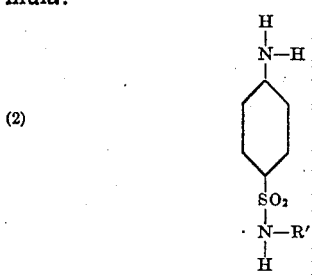

where R' has the same significance as before, in a suitable solvent, such as methyl or ethyl alcohol, or ethylene or propylene glycol, or dioxane, we add one molecular equivalent of an aqueous solution of formaldehyde, and one molecular equivalent of a mercapto acid of the general formula:

(3)         H—S—R—$R_{AC}$—H in which R and $R_{AC}$ have the same meaning as before.

It is desirable but not necessary to add the aldehyde before adding the mercapto acid; and the mercapto acid may be added, and it is desirable to add it, in moderate excess.

The further addition, as a catalyst, of a relatively small amount of a strong, non-oxidizing acid (such for instance as hydrochloric, phosphoric, or sulphuric acid), though not imperative, facilitates and greatly expedites the reaction. The total concentration of the acid catalyst need not exceed 0.05%.

The ingredients thus brought together react to produce an acid of the type shown in Formula 1, with X signifying hydrogen; but that acid is in solution. Some of the acids may be precipitated from solution by the addition of a relatively large volume of water. This precipitation may be facilitated by the addition of sodium chloride or other salting-out reagent. The solid acid thus obtained may be separated from the supernatant liquid in a suitable manner, as by filtration, decantation, or centrifugation. As thus obtained it is an amorphous mass. This amorphous mass is washed with water, and then dried, as in a vacuum desiccator. To obtain the more water-soluble acids in solid form we remove the solvent by evaporation, preferably at low temperature under reduced pressure. The usually sirupy or gummy acid so obtained is suitably dried, as in a vacuum desiccator.

Salts may readily be obtained, either from the solid acid so produced or directly from the non-aqueous solution in which the acid was prepared. For conversion to a salt, the acid, as represented for Formula 1 with X signifying hydrogen, after dissolution in a suitable solvent such for example as absolute alcohol if it is not already in solution, is treated with a solution in the same or a mutually miscible and desirably anhydrous solvent of the desired base, such as sodium hydroxide or ethoxide, calcium ethoxide, magnesium ethoxide, or directly with ammonia, or with the desired alkyl- or alkanolamine or polymethylenediamine. In general, the metallic salts so formed precipitate by reason of their relative insolubility in the solvent used. If precipitation does not occur, or is incomplete, it may be produced or brought to completion by adding dry ether or acetone.

In general the ammonium and aminium salts are relatively alcohol-soluble, but may be obtained in solid form by evaporation of the solvent and any excess of base present, preferably at low temperature under reduced pressure. In some cases the salts may also be precipitated from solution by the addition of dry ether or acetone. The solid products so obtained are suitably dried, as in a vacuum desiccator.

Examples of the general process are as follows:

*Example 1.*—To 5.2 g. of p-aminobenzenesulphonylamide (i. e., sulphanilamide), dissolved and suspended in 100 cc. of absolute ethyl alcohol, we add 4.5 cc. of 36% formalin solution, 2.5 cc. of thioglycolic (2-mercaptoethanoic) acid, and 10 drops of 36% hydrochloric acid. The mixture is then shaken at room temperature until the sulphanilamide is completely dissolved, and until water dilution and neutralization with sodium bicarbonate of a small test portion of the solution produces no precipitate of sulphanilamide. The acid thus formed in alcoholic solution is represented by the following formula:

(4) 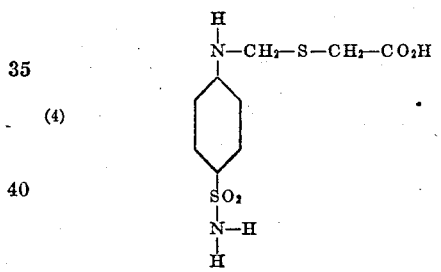

and is soluble in water and in dilute aqueous alcohol. It is obtained in solid form by evaporation of the solvent at low temperature under reduced pressure, and drying of the resultant acid gum in a vacuum desiccator over phosphorus pentoxide.

We prepare the sodium salt of this acid by adding an alcoholic solution of sodium ethoxide, prepared by adding 2.5 g. of metallic sodium to 100 cc. of absolute ethyl alcohol, either to the alcoholic solution of the acid prepared as described above, or to a solution of about 8.3 g. of solid acid in about 100 cc. of absolute alcohol. The sodium salt, being relatively insoluble in alcohol, separates, and is collected by filtration and dried in a vacuum desiccator.

This salt has the formula:

(5) 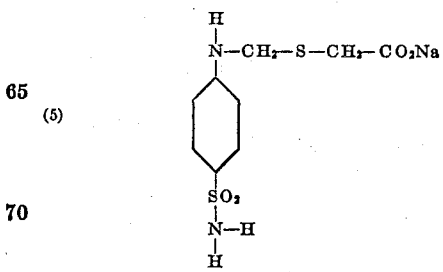

We prepare the ammonium salt of the acid shown in Formula 4 by dissolving an excess of dry ammonia gas in an alcoholic solution of the acid, prepared as described above or by dissolving the solid acid in absolute ethyl alcohol. It is desirable to cool the solution while the ammonia gas is being passed into it. After the reaction is complete, the solvent is then removed at low temperature by evaporation under reduced pressure. The salt so obtained, which is hygroscopic, is dried in a vacuum desiccator.

This ammonium salt has the formula:

(6) 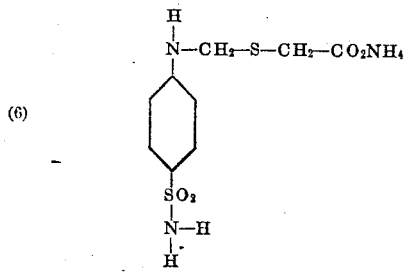

We prepare the ethanolamine, diethanolamine, propanolamine, and isopropanolamine salts by adding slightly more than one molecular equivalent of the required amine, dissolved in a small amount of absolute alcohol (say 10 volumes), to an alcoholic solution of the acid shown in Formula 4. The solution of the acid is prepared as described above, or by dissolving the solid acid in absolute alcohol. The resultant salt solution is further treated as described in the case of the ammonium salt.

We prepare the ethylenediamine mono-acid salt containing one molecular equivalent of ethylenediamine to one molecular equivalent of the acid shown in Formula 4 by adding an alcoholic solution of slightly more than one molecular equivalent of ethylenediamine to an alcoholic solution of one molecular equivalent of that acid and proceeding as described for the other amine salts.

This salt has the following formula:

(7) 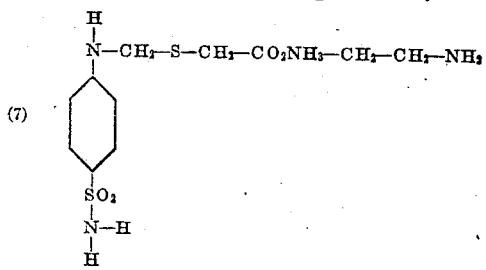

We prepare the ethylenediamine di-acid salt, containing one molecular equivalent of ethylenediamine to two molecular equivalents of the acid shown in Formula 4 by adding an absolute alcohol solution of one molecular equivalent of ethylenediamine to an alcoholic solution of two molecular equivalents of the acid shown in Formula 4.

The salt has the following formula:

(8) 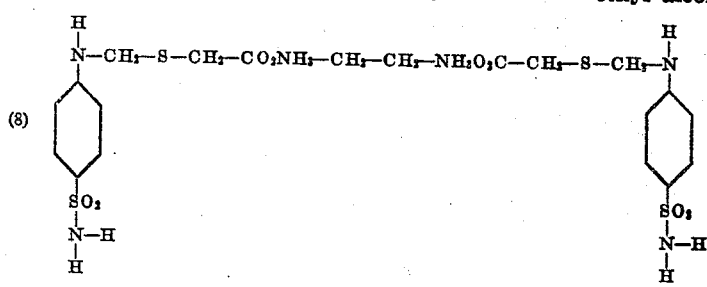

It is soluble in alcohol, but may be obtained in solid form by dilution of the alcoholic solution with a relatively large quantity of dry acetone (say ten to fifteen volumes). The salt thus precipitated is collected by filtration and dried in a vacuum desiccator. Better yields are obtained, however, when the alcoholic solution of this salt is treated as described above for the alcoholic solutions of the ammonium and other amine salts.

*Example 2.*—To 6.5 g. of p-aminobenzenesulphonylethanolamide, dissolved and suspended in 100 cc. of absolute ethyl alcohol, we add 4.5 cc. of 36% formalin solution, 2.5 cc. of thioglycolic acid, and 10 drops of 36% hydrochloric acid, and proceed further in the manner described in Example 1. The acid thus formed in alcoholic solution is represented by the formula:

(9) 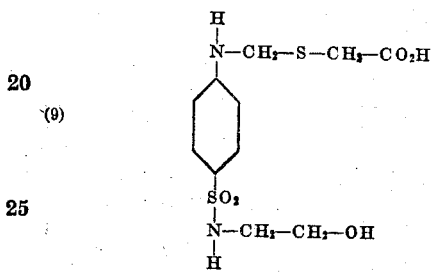

It may be obtained in solid form as described in Example 1.

We prepare the sodium salt in the manner described in Example 1. This sodium salt is represented by the following formula:

(10) 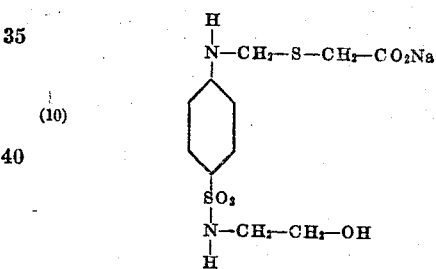

We prepare the ammonium, ethanolamine, diethanolamine, propanolamine, isopropanolamine and ethylenediamine mono-acid salts in the manner described in Example 1 from the acid represented in Formula 9 and the required base.

The ethylenediamine di-acid salt, corresponding to that shown in Formula 8 of Example 1, is not precipitated from alcoholic solution by dilution of the solution with dry acetone. It is obtained in solid form in the manner described for the ammonium and the other amine salts of Example 1.

*Example 3.*—To 7.5 g. of α-p-aminobenzenesulphonylamido)-pyridine (i. e., sulphapyridine), dissolved and suspended in 100 cc. of absolute ethyl alcohol, we add 4.5 cc. of 36% formalin, 2.5 cc. of thioglycolic acid, and 10 drops of 36% hydrochloric acid, and proceed as described in Examples 1 and 2. The acid thus obtained in alcoholic solution is represented by the formula:

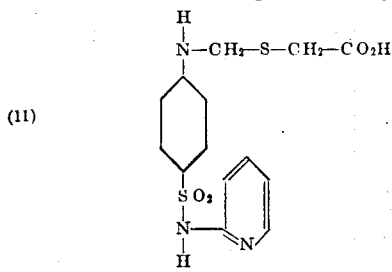
(11)

It is obtained in solid form by dilution of the alcoholic solution with a large volume of ice-water. (If desired the alcoholic solution may be diluted with a dilute sodium bicarbonate solution. It is then filtered, chilled and made slightly acid with hydrochloric acid. An excess of strong acid is to be avoided because of its solubilizing effect.) In either case, the amorphous acid so precipitated from alcoholic solution is collected by filtration, washed with water, and dried in a vacuum desiccator.

We prepare the sodium salt, either from the original alcoholic solution of the acid shown in Formula 11, or from an absolute alcohol solution of the solid acid, in the manner already described in Example 1. It is represented by the following formula:

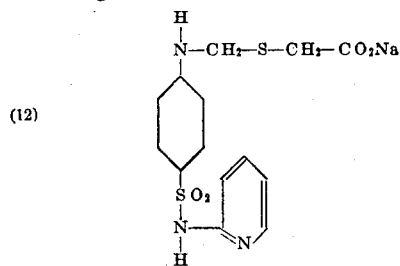
(12)

The ammonium, the ethanolamine, the diethanolamine, the propanolamine, the isopropanolamine, and the ethylenediamine salts are prepared in the manner described in Examples 1 and 2. The ammonium salt is obtained in solid form in the manner described in Example 1. The amine salts may be precipitated from alcoholic solution by the addition of a relatively large volume of dry acetone in the manner described for the salt shown in Formula 8 of Example 1. Better yields are obtained, however, by following the other procedure for obtaining the ammonium and other amine salts in the manner described in Example 1.

*Example 4.*—To 8.0 g. of 2-(p-aminobenzene-sulphonylamido)-4-methylthiazole (i. e., methyl sulphathiazole), dissolved and suspended in 100 cc. of absolute ethyl alcohol, we add 4.5 cc. of 36% formalin, 2.5 cc. of thioglycolic acid, and 10 drops of 36% hydrochloric acid, and proceed as described in Examples 1, 2, and 3. The acid thus produced in alcoholic solution is represented by the formula:

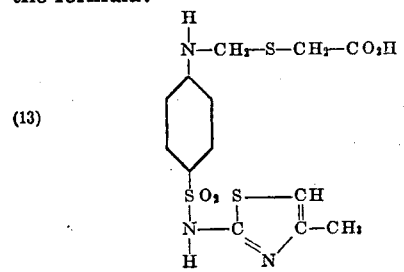
(13)

The acid shown in Formula 13 may be obtained in solid form by the method described in Examples 1 and 2, or by dilution of the alcoholic solution with a large volume of ice-water as described in Example 3.

We prepare the sodium salt of the acid shown in Formula 13 by the method described in Examples 1, 2, and 3. This salt is represented by the following formula:

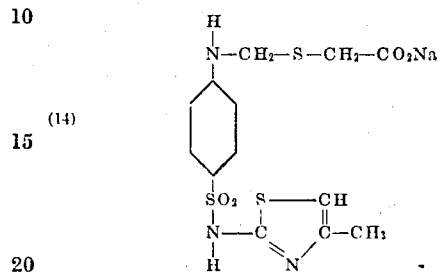
(14)

*Example 5.*—To 7.7 g. of 2-(p-aminobenzene-sulphonylamido)-thiazole (i. e., sulphathiazole), dissolved and suspended in 100 cc. of absolute ethyl alcohol, we add 4.5 cc. of 36% formalin, 2.5 cc. of thioglycolic acid, and 10 drops of 36% hydrochloric acid, and proceed in the manner described in Examples 1 and 2. The acid so produced is represented by the following formula:

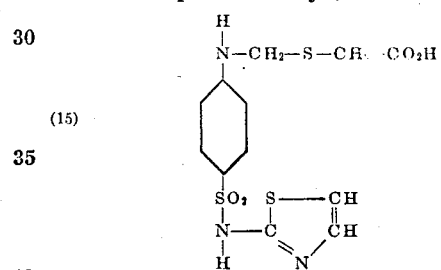
(15)

We prepare the sodium salt of the acid shown in Formula 15 in the manner described in Examples 1, 2, and 3. This salt is represented by the following formula:

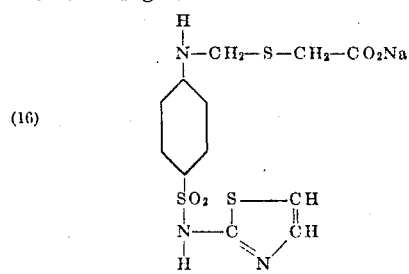
(16)

*Example 6.*—To 10.0 g. of 2-(p-aminobenzene-sulphonyl)-4-phenylthiazole (i. e., phenyl sulphathiazole), dissolved and suspended in 100 cc. of absolute ethyl alcohol, we add 4.5 cc. of 36% formalin, 2.5 cc. of thioglycolic acid, and 10 drops of 36% hydrochloric acid, and proceed as described in Examples 1 and 2. The acid thus produced in alcoholic solution is represented by the following formula:

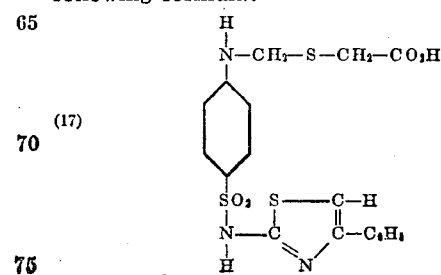
(17)

The acid shown in Formula 17 may be obtained in solid form by the method described in Examples 1 and 2, or by either modification of the method described in Example 3.

We prepare the sodium salt of the acid shown in Formula 17 in the manner described in Examples 1, 2, and 3. It is represented by the following formula:

(18)
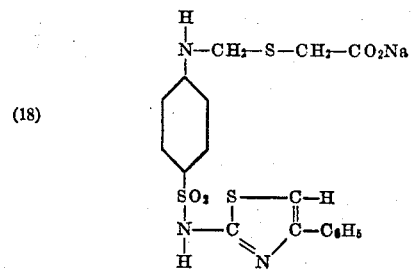

*Example 7.*—To 5.6 g. of p-aminobenzenesulphonylhydroxamide, dissolved and suspended in 100 cc. of absolute ethyl alcohol, we add 4.5 cc. of 36% formalin, 2.5 cc. of thioglycolic acid, and 10 drops of 36% sulphuric acid, and proceed as in Example 3. The acid so produced is represented by the following formula:

(19)
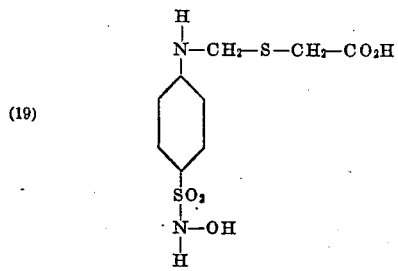

We prepare the sodium salt of the acid shown in Formula 19 in the same manner as in Examples 1, 2, and 3. It is represented by the following formula:

(20)
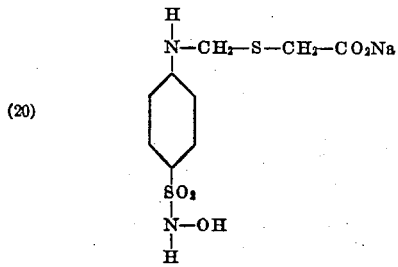

*Example 8.*—To 5.2 g. of p-aminobenzenesulphonylamide (i. e., suphanilamide), dissolved and suspended in absolute ethyl alcohol, we add 4.5 cc. of 36% formalin, 5.8 g. of p-mercaptobenzenesulphonic acid, and 5 drops of 36% phosphoric acid, and proceed as in Examples 1 and 2. The acid so produced in alcoholic solution is represented by the formula:

(21)
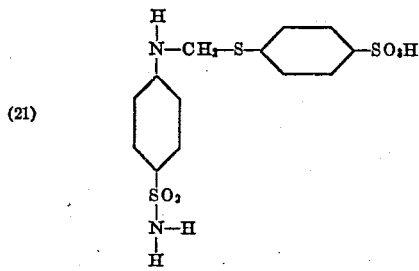

The acid as shown in Formula 21 is water-soluble, and hence cannot be precipitated from alcoholic solution by dilution of the solution with ice-water as in Example 3. Because of its relative instability, some decomposition attends removal of the solvent by evaporation, even at low temperature under reduced pressure, as in Examples 1 and 2.

We prepare the sodium salt of the acid shown in Formula 21 directly from the original alcoholic solution as described in Examples 1 and 2. It is represented by the following formula:

(22)
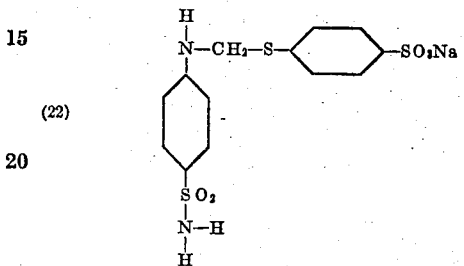

*Example 9.*—To 7.5 g. of α-(p-aminobenzenesulphonylamido)-pyridine (i. e., sulphapyridine), dissolved and suspended in 100 cc. of absolute alcohol, we add 4.5 cc. of 36% formalin, 2.7 cc. of β-mercaptopropionic acid, and 10 drops of 36% hydrochloric acid, and proceed as in Examples 1 and 2. The acid thus produced in alcoholic solution is represented by the following formula:

(23)
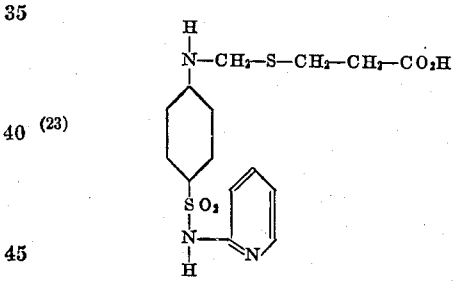

If desired it may be obtained in solid form by one or the other modification of the procedure described in Example 3.

We prepare the sodium salt directly from the original alcoholic solution as in Examples 1, 2, and 3. This salt is represented by the following formula:

(24)
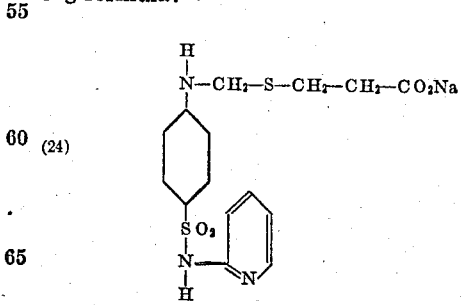

*Example 10.*—To 8.0 g. of 2-(p-aminobenzenesulphonylamido)-4-methylthiazole (i. e., methyl sulphathiazole), dissolved and suspended in 100 cc. of absolute ethyl alcohol, we add 4.5 cc. of 36% formalin, 4.4 g. of o-mercaptobenzoic acid, and 10 drops of 36% hydrochloric acid, and proceed as in Example 8. The acid thus produced in alcoholic solution is represented by the following formula:

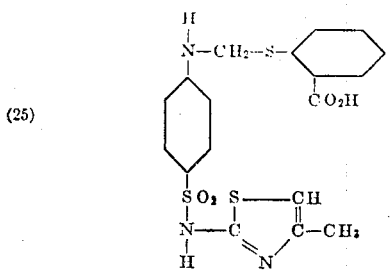
(25)

Like the acid described in Example 8 (Formula 21), this acid as shown in Formula 25 does not readily lend itself to isolation in the form of the solid free acid. We prepare the sodium salt directly from the original alcoholic solution in the manner of Example 8. This salt may be represented by the following formula:

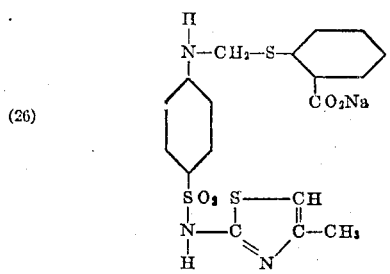
(26)

The structures as indicated in Formulas 1 and 4 to 26 show the derivatives of p-aminobenzenesulphonylamide without any methylol groups in the benzene nucleus of the p-aminobenzenesulphonylamido group. It is known that when an aromatic primary amine is treated with formaldehyde in acid solution some of the formaldehyde tends to condense with the aromatic ring to yield a methylol derivative. It is therefore possible that the products resulting from the practice of the methods described in the examples contain some of the methylol groups in the benzene ring. We have been unable to ascertain the precise amount of the methylol compounds in the reaction product of each of these examples.

We claim as our invention:

1. A derivative of an $N^4$-aminobenzenesulphonylamide having the following formula:

$$Y—CH_2—S—R—COOX$$

in which Y represents an $N^4$-monodehydrogenated residue of a compound selected from the class consisting of $N^4$-aminobenzenesulphonylamide, α-($N^4$-aminobenzenesulphonylamido) pyridine, 2-($N^4$-aminobenzenesulphonylamido)-4-methylthiazole, 2-($N^4$-aminobenzenesulphonylamido)thiazole, and 2-($N^4$-aminobenzenesulphonylamido)-4-phenylthiazole, the $N^4$-amino nitrogen atom of said residue being directly attached to the carbon atom of the formula; R represents a hydrocarbon radical selected from the class consisting of the methylene radical and the ethylene radical; and X represents a member of the class of positive ions consisting of hydrogen, the alkali metals, the normal equivalents of the alkaline-earth metals, the nitrogen hydro-onium ions derived from ammonia, the alkylamines, the alkanolamines, and the polymethylenediamines.

2. A derivative of an $N^4$-aminobenzenesulphonylamide which is represented by the following formula:

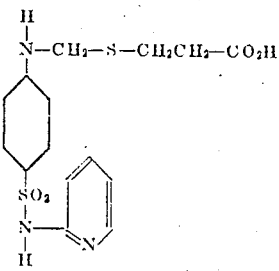

3. A derivative of an $N^4$-aminobenzenesulphonylamide which is represented by the following formula:

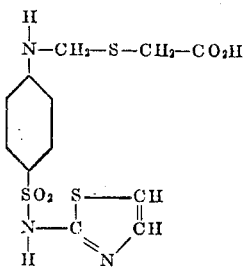

4. The process of producing a reaction product which comprises treating a compound selected from the class consisting of $N^4$-aminobenzenesulphonylamide, α-($N^4$-aminobenzenesulphonylamido) pyridine, 2-($N^4$-aminobenzenesulphonylamido)-4-methylthiazole, 2-($N^4$-aminobenzenesulphonylamido)thiazole, and 2-($N^4$-aminobenzenesulphonyl)-4-phenylthiazole with formaldehyde and a mercapto acid having the following formula:

$$H—S—R—COOH$$

in which R represents a hydrocarbon radical selected from the class consisting of the methylene radical and the ethylene radical.

5. The process of producing a reaction product in accordance with claim 4, in which a nonoxidizing mineral acid is employed as a catalyst.

6. The process of producing a reaction product which comprises treating α-($N^4$-aminobenzenesulphonylamido)pyridine with formaldehyde and β-mercaptopropionic acid.

7. The process of producing a reaction product which comprises treating 2-($N^4$-aminobenzenesulphonylamido)thiazole with formaldehyde and thioglycolic acid.

MORRIS S. KHARASCH.
OTTO REINMUTH.

Certificate of Correction

Patent No. 2,303,698.  December 1, 1942.

MORRIS S. KHARASCH ET AL.

It is hereby certified that errors appear in the printed specification of the above numbered patent requiring correction as follows: Page 1, second column, lines 27 to 30, for

page 3, second column, line 58, for "α-p-aminobenzene-" read α-(p-aminobenzene-; and that the said Letters Patent should be read with these corrections therein that the same may conform to the record of the case in the Patent Office.

Signed and sealed this 26th day of January, A. D. 1943.

[SEAL]

HENRY VAN ARSDALE,
*Acting Commissioner of Patents.*